United States Patent
Chen et al.

(10) Patent No.: US 7,046,910 B2
(45) Date of Patent: May 16, 2006

(54) METHODS AND APPARATUS FOR TRANSCODING PROGRESSIVE I-SLICE REFRESHED MPEG DATA STREAMS TO ENABLE TRICK PLAY MODE FEATURES ON A TELEVISION APPLIANCE

(75) Inventors: Kun-Pei Chen, Ambler, PA (US); Joseph Mehr, North Wales, PA (US); Mandayam Narasimhan, San Diego, CA (US); Ajay Luthra, San Diego, CA (US); Tom du Breuil, Ivyland, PA (US)

(73) Assignee: General Instrument Corporation, Horsham, PA (US)

( * ) Notice: Subject to any disclaimer, the term of this patent is extended or adjusted under 35 U.S.C. 154(b) by 1077 days.

(21) Appl. No.: 09/847,143

(22) Filed: May 2, 2001

(65) Prior Publication Data

US 2001/0026677 A1 Oct. 4, 2001

Related U.S. Application Data

(63) Continuation-in-part of application No. 09/196,709, filed on Nov. 20, 1998, now Pat. No. 6,434,195.

(60) Provisional application No. 60/238,495, filed on Oct. 6, 2000.

(51) Int. Cl.
*H04N 5/783* (2006.01)

(52) U.S. Cl. .................................... 386/68; 386/111

(58) Field of Classification Search ................ 386/6–8, 386/33, 68, 81, 82, 111–112; 375/240.01; 725/88–90, 102; H04N 5/781, 5/783
See application file for complete search history.

(56) References Cited

U.S. PATENT DOCUMENTS

| 5,057,916 | A | | 10/1991 | Krause |
| 5,477,397 | A | | 12/1995 | Naimpally |
| 5,568,200 | A | | 10/1996 | Pearlstein et al. |
| 5,717,816 | A | | 2/1998 | Boyce et al. |
| 5,778,143 | A | | 7/1998 | Boyce |
| 5,862,295 | A | * | 1/1999 | Shimoda et al. ............... 386/68 |
| 5,892,882 | A | * | 4/1999 | Kuroda et al. ................. 386/68 |
| 6,078,693 | A | * | 6/2000 | Kawamura et al. .......... 382/238 |
| 6,418,269 | B1 | * | 7/2002 | Rijckaert ....................... 386/68 |
| 6,549,717 | B1 | * | 4/2003 | Mishima et al. .............. 386/68 |
| 2002/0061183 | A1 | | 5/2002 | MacInnis |

FOREIGN PATENT DOCUMENTS

| EP | 0 485 798 | 5/1992 |
| EP | 1 009 166 | 6/2000 |

* cited by examiner

*Primary Examiner*—Thai Tran
(74) *Attorney, Agent, or Firm*—Robert P. Marley

(57) ABSTRACT

Progressive I-slice refreshed MPEG data streams are transcoded to I-frame based MPEG data streams to enable trick play modes on a television appliance, such as pause, scan forward, scan backward, jump, or still frame displays for use, e.g., in film indexing (chapters). A progressive I-slice refreshed MPEG data stream 10 having I-slices distributed over multiple P-frames is received by a television appliance 300. The P-frames are decoded at decoder 220 to recover the I-slices which make up a complete I-frame. The recovered I-slices are assembled (e.g., by processor 230) into a complete I-frame. The complete I-frame is encoded at an encoder 250. A selected P-frame in the MPEG data stream is replaced with the encoded I-frame (e.g., via multiplexer 255) to provide an encoded I-frame based data stream 200. The I-frame based data stream is stored (e.g., in memory 240) for trick play mode use.

26 Claims, 4 Drawing Sheets

METHODS AND APPARATUS FOR TRANSCODING PROGRESSIVE I-SLICE REFRESHED MPEG DATA STREAMS TO ENABLE TRICK PLAY MODE FEATURES ON A TELEVISION APPLIANCE

This application is a continuation-in-part of, commonly assigned U.S. patent application Ser. No. 09/196,709 filed on Nov. 20, 1998, now U.S. Pat. No. 6,434,195B 1. This application claims the benefit of U.S. provisional patent application No. 60/238,495 filed on Oct. 6, 2000.

BACKGROUND OF THE INVENTION

The present invention relates to MPEG digital video encoding and decoding (e.g., for digital television). In particular the present invention relates to methods and apparatus for transcoding progressive I-slice refreshed Moving Pictures Expert Group (MPEG) data streams to I-frame based data streams to facilitate "trick play" modes on a television appliance. Trick play modes include pause, scan forward, scan backward, jump, still frame display, and the like.

In order to understand the concept of progressive I-slice refreshed MPEG data streams, it is necessary to understand some basics about the typical I-frame based MPEG data stream. MPEG gets much of its compression capability by sending only the changes between different video frames. A first type of frame, known as a prediction or "P" frame, contains an abridged set of data used by the decoder to predict a full frame from a previous "P" frame or from a previous complete frame (an intra-coded "I" frame) in the video stream. The stream merely carries "fine tuning" information to correct errors from an approximate prediction. An I-frame is compressed without motion prediction. Thus, a full video frame can be reconstructed from an I-frame without reference to any other frame. In this manner, errors in the prior frame predictions will be eliminated once an I-frame arrives and is decoded. Bidirectional "B" frames are like P-frames, except that the prediction is made not only from the previous I or P-frame, but also from the next one. MPEG data streams encoded in this manner are referred to herein as "I-frame based MPEG data streams." An I-frame based MPEG data stream may start with an optional Group-of-Pictures (GOP) header followed by an I-frame. The video frame can be reconstructed from the GOP without reference to other frame information.

In progressively refreshed streams, such as taught in commonly owned U.S. Pat. No. 5,057,916 to Krause et al. entitled "Method and Apparatus for Refreshing Motion Compensated Sequential Video Images," sequential video images are refreshed one region at a time. A different region in each of the plurality of video images is communicated without compression during a refresh cycle. In this manner, an image area defined by the region is progressively refreshed by the non-compressed regions during the refresh cycle. Compression of video images may be controlled to prevent data contained in regions not yet refreshed during a current refresh cycle from corrupting data contained in regions that have been refreshed during the current refresh cycle.

When an MPEG encoder is used in the progressive refresh mode, the I-frames are broken into slices and distributed across the transmitted P-frames as I-slices. MPEG data streams encoded in this manner are referred to herein as "progressive I-slice refreshed MPEG data streams." The spreading of I-slices over multiple P-frames equalizes the bit rate and does not present a problem when the stream is played back sequentially. However, when trying to implement trick play modes in a progressive I-slice refreshed MPEG data stream, the lack of I-frames requires either extremely large buffers for several pictures worth of data or the stream must be fully decoded and then re-encoded as an I-frame based stream resulting in a loss of quality. This additional decoding and re-encoding also requires extra hardware, thereby incurring extra cost in the television appliance (e.g., set-top terminal, personal versatile recorder, and the like). Currently, no commercially available systems exist to perform trick play modes on progressive I-slice refreshed MPEG data streams.

Commonly owned, co-pending U.S. patent application Ser. No. 09/196,709 filed on Nov. 20, 1998 discloses techniques for the splicing of video data in progressive I-slice refreshed compressed bit streams for, e.g., the insertion of commercials in a video stream. Commercial insertion, promo insertion, studio routing, camera switching, tape editing, and the like are basic operations in television production and broadcasting. In present day analog systems, switching takes place in the vertical interval of the video signal. With the advent of digital television as implemented, for example, in the MPEG standards, switching or "splicing" with compressed bit streams is very complicated. In order to facilitate such operations, the MPEG-2 standard defines "splice points" where point signals (e.g., a commercial) can be substituted for another signal (e.g., a main program) in a video stream.

The Society of Motion Picture and Television Engineers (SMPTE) is currently working on a draft standard for splicing MPEG-2 transport streams. See, for example, Proposed SMPTE Standard PT20.02/010 "Splice Points for MPEG-2 Transport Streams", Second Draft, July 1997, incorporated herein by reference.

There are various reasons why splicing I-frame based MPEG video is more difficult than switching uncompressed video. As discussed above, decoding of a B-frame requires not only the previous I or P-frame, but also the next one. For purposes of splicing, this means that while it is possible to leave an old stream after any P or I-frame, it is not possible to leave the stream after a B-frame since that would cut off the backward prediction reference frame for that B-frame. From the point of view of the bit stream, this means that a first video stream may only be left after a P or I-frame and all of the B-frames (if any) that immediately follow it have passed.

Matters are further complicated when the compressed MPEG data stream is a progressive I-slice refreshed MPEG data stream, rather than an I-frame based stream. For commercial insertion or switching purposes, compressed video from a first source is replaced with compressed video from a second source at a predefined insertion point in the video data stream. If the video from either or both of the first and second source is progressively refreshed using I-slices, then progressive refresh related artifacts will appear at one or both of the boundaries between the first and second source video. As discussed in detail in commonly owned, co-pending U.S. patent application Ser. No. 09/196,709 referenced above, the problem of progressive refresh related artifacts can be overcome by commencing processing of a frame to be inserted prior to the insertion time. First, the video to be inserted is decompressed sufficiently prior to the insertion point to enable the recovery and recompression of a first frame to be inserted. As noted above, the "first frame to be inserted" is the first frame in the encoding order and not necessarily the first frame in the display order. Once this frame has been decompressed, it is recompressed as an intra-coded I-frame. Such intra-coded frames are able to be reconstructed without referring to any other frame, and therefore are not subject to progressive refresh. After the recovered first frame is recompressed as an I-frame, it is used as the first frame inserted at the insertion point.

It would be advantageous to provide a method and apparatus for enabling trick play modes on progressive I-slice refreshed MPEG data streams and other types of progressively refreshed data streams. It would be further advantageous to provide such a scheme where the processing required for transcoding in order to enable trick play modes is minimized to allow for real time performance. It would be advantageous to use techniques similar to those used for commercial insertion in progressive I-slice refreshed MPEG data streams to enable trick play modes on a PVR or similar device which receives progressive I-slice refreshed MPEG data streams.

The methods and apparatus of the present invention provide the foregoing and other advantages.

SUMMARY OF THE INVENTION

The invention provides transcoding of progressive I-slice refreshed MPEG data streams to I-frame based MPEG data streams to enable trick play modes on a television appliance, including pause, scan forward, scan backward, jump, or still frame displays such as for film indexing (chapters). A progressive I-slice refreshed MPEG data stream having I-slices distributed over multiple P-frames is received by a television appliance. The P-frames are decoded by the decoder to recover the I-slices which make up a complete I-frame. The recovered I-slices are assembled (e.g., by processor) into a complete I-frame. The complete I-frame is encoded at an encoder. A selected P-frame in the MPEG data stream is replaced with the encoded I-frame to provide an encoded I-frame based data stream. The I-frame based data stream is stored for trick play mode use.

BRIEF DESCRIPTION OF THE DRAWINGS

The present invention will hereinafter be described in conjunction with the appended drawing figures, wherein like numerals denote like elements, and.

DETAILED DESCRIPTION OF THE INVENTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing a preferred embodiment of the invention. It being understood that various changes may be made in the function and arrangement of elements without departing from the spirit and scope of the invention as set forth in the appended claims.

The present invention provides methods and apparatus for transcoding progressive I-slice refreshed MPEG data streams to I-frame based MPEG data streams to facilitate trick play modes in, for example, a television appliance such as a personal versatile recorder (PVR), a set-top terminal, a digital video recorder, a digital television, a personal computer, or similar device. Such trick play modes can comprise, for example, pause, scan forward, scan backward, jump, and still frame displays (e.g., for film indexing). Such features are particularly advantageous for use with video on demand (VOD) services.

It should be appreciated by those skilled in the art that, although the invention is described in connection with MPEG data streams, the invention may be utilized to enable trick play modes where any type of progressively refreshed data streams are received. In addition, it should be understood, for purposes of the present discussion, that the terms "frame" and "video frame" are used in a generic sense to mean a portion of a video signal or stream from which other portions are reconstructed using, for example, an I-frame, P-frame or B-frame. Thus, although typically a "frame" will be a "full" video frame, it is not intended to limit the meaning thereof to a full video frame for purposes of the present disclosure, since implementations may exist or be developed wherein, e.g., subframe, field, subfield, or other processing is used. With respect to processing of video on a field level instead of a frame level, it should be appreciated that I-fields, P-fields and B-fields may be used. In such cases, these fields are equivalent to and are intended to be covered by the broad terms "frame" and "video frame" as used in the frame processing of video signals.

The present invention provides for transcoding progressive I-slice refreshed MPEG data streams to I-frame based MPEG data streams to enable trick play modes on a television appliance. The progressive I-slice based refresh mode does not have a GOP header, nor does it have any I-frames. The entire stream is built as a "PBBPBBPBBPBBP . . . " sequence where "P" represents P-frames and "B" represents B-frames.

Figure 1:
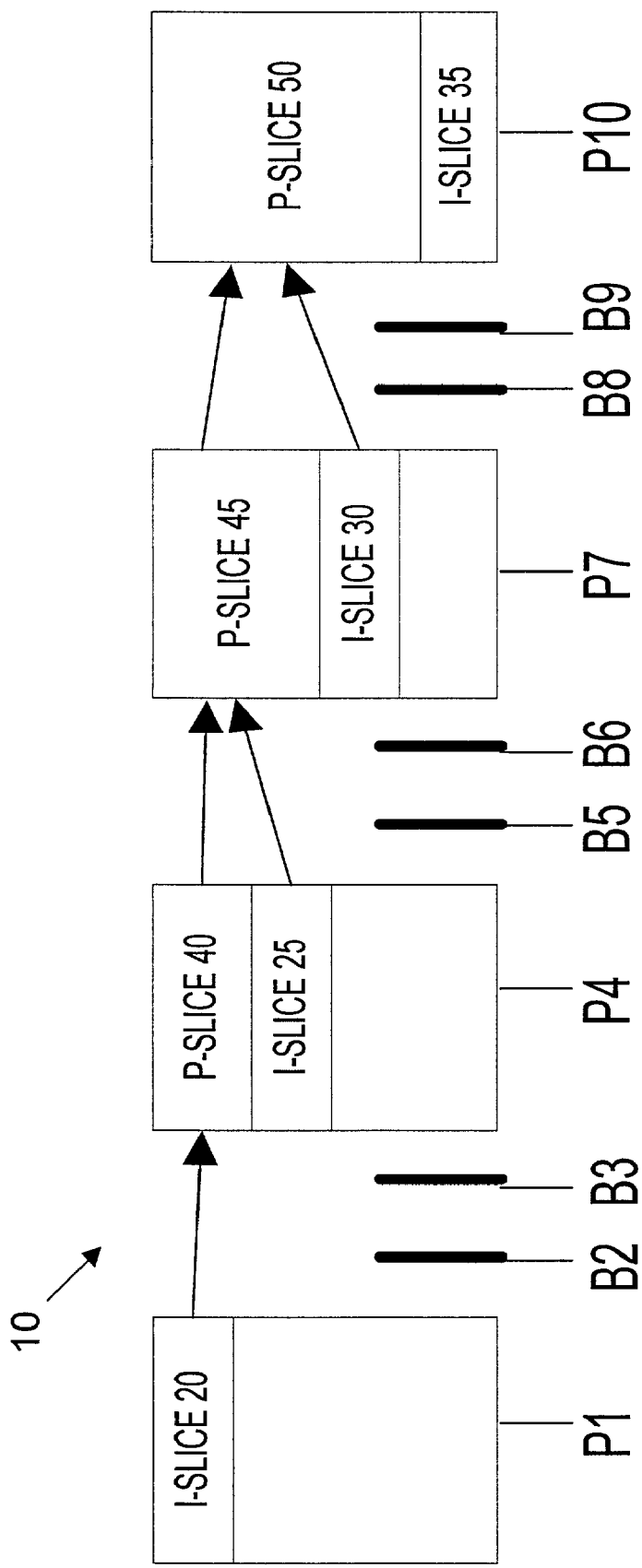
FIG. 1 shows an example of a progressive I-slice refreshed data stream.

FIG. 1 shows an example of a progressive I-slice refreshed MPEG data stream. The I-frame is divided into slices and spread, as I-slices, uniformly over the P-frames. In the example shown in FIG. 1, an I-frame is divided into four I-slices 20, 25, 30, and 35. The four I-slices 20, 25, 30 and 35 are spread over four P-frames, P1, P4, P7 and P10. By spreading the I-frame as I-slices over multiple P-frames in this way, the burst data rate can be averaged from one I-frame over several P-frames. In other words, the instantaneous bit rate is equalized over each frame. B-frames are encoded the same way as in I-frame based refresh mode. The placement of the B-frames are indicated in FIG. 1 as B2, B3, B5, B6, B8, and B9. Reconstructing a P-frame requires the previous frame. With a progressive I-slice refreshed approach, no prediction can be made as to how many frames are required to build a picture. However, the 'refresh rate' parameter can be set from, e.g., two to thirty-two frames in the encoder. The refresh rate is number of total frames in a refresh cycle. This means that, on average, the 'refresh rate' number of frames are required to collect a complete set of I-slices and build a complete video picture. It should be appreciated, however, that this refresh rate parameter can vary in other encoder designs.

In the example shown in FIG. 1, a refresh rate of 10 is indicated, as the P-frames P1, P4, P7, and P10 and interspersed among six B-frames (B2, B3, B5, B6, B8, and B9) so that 10 total frames are required before a picture is completely refreshed using all four I-slices 20, 25, 30 and 35. I-slice 20 contained in P-frame P1 provides reference macroblocks used to create motion vectors that predict the contents of P-slice 40 in P-frame P4. In the same way, I-slice 25 and P-slice 40 contained in P-frame P4 provide reference macroblocks that can be used to predict the contents of P-slice 45 contained in P-frame P7. Similarly, I-slice 30 and P-slice 45 contained in P-frame P7 provide reference macroblocks that can be used to predict the contents of P-slice 50 contained in P-frame P10. I-slice 35 and P-slice 50 contained in P-frame P10 provide the next P-frame (not shown) with reference macroblocks for the predicted part of the picture.

The general concept of the present invention is to replace one P-frame from the progressive I-slice refreshed MPEG data stream with a complete I-frame every 'refresh rate' (N) number of frames. The rest of the stream will remain unchanged. This new I-frame based stream is indexed for storage on a hard drive (or other high capacity storage device such as an optical device or other comparable storage device now or hereafter known), and the index gives the processor an easy way to retrieve the correct data for decoding in the trick play modes.

Figure 2:
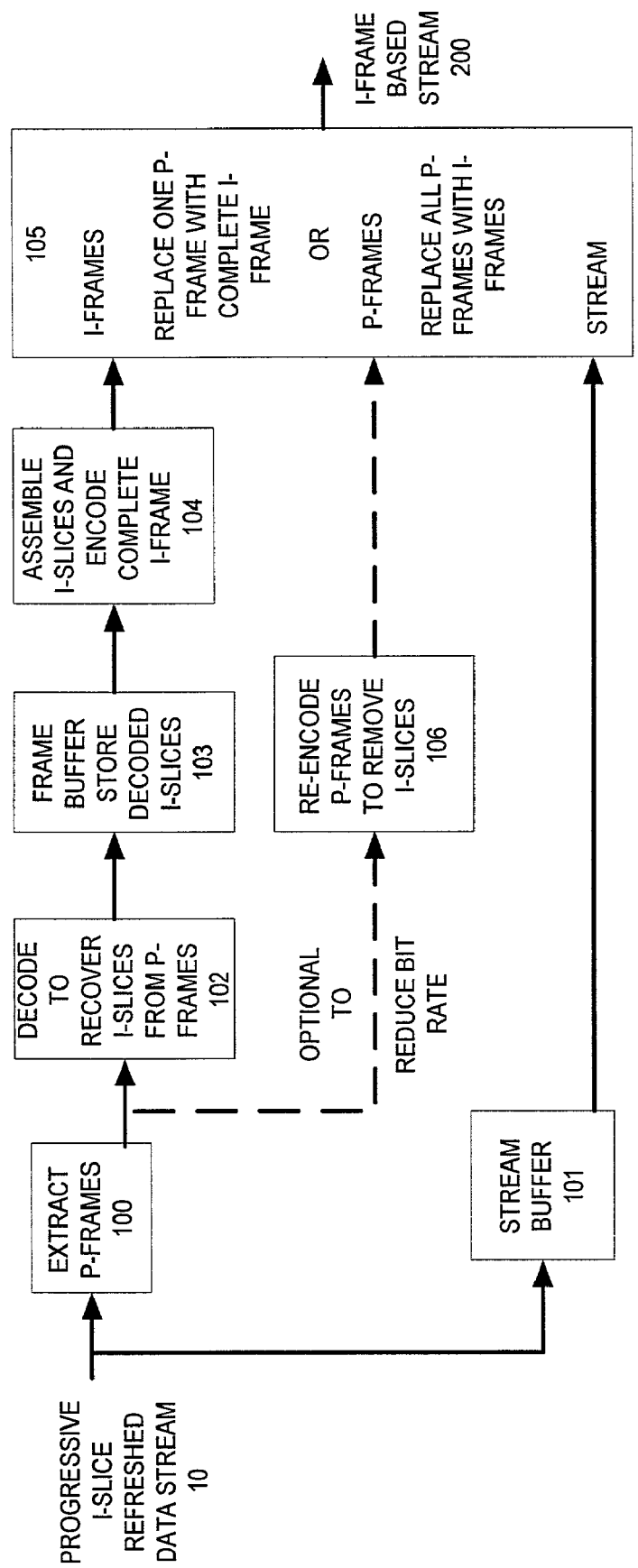
FIG. 2 shows a flow chart illustrating a procedure for transcoding a progressive I-slice refreshed MPEG data stream to an I-frame based MPEG data stream in accordance with the present invention.

FIG. 2 shows a flowchart of an exemplary embodiment of the invention. A progressive I-slice refreshed MPEG data stream 10 having I-slices distributed over multiple P-frames (e.g., as described in connection with FIG. 1) is received at a television appliance. The P-frames are extracted (i.e. copied) (step 100) from the data stream 10. The complete incoming data stream 10 is also buffered (step 101). The extracted P-frames are decoded (step 102) to recover the I-slices which make up a complete I-frame. Those skilled in the art will appreciate that the P-frames need only be partially decoded in order to recover the I-slices, although the entire P-frame may be decoded to recover the I-slices if desired. The recovered I-slices are stored in a frame buffer (step 103). Once all I-slices which make up a complete I-frame are recovered, the I-slices are assembled into a complete I-frame and encoded (step 104). The decoded P-frame information may be discarded. A selected P-frame in the buffered MPEG data stream is replaced with the complete I-frame to provide an encoded I-frame based data stream (step 105). The I-frame based data stream 200 is stored for trick play mode use.

As optionally shown in FIG. 2, in order to reduce the bit rate of the resulting I-frame based MPEG data stream, the extracted P-frames may be re-encoded using motion estimation techniques to remove the I-slices (optional step 106) and these re-encoded P-frames may be reinserted into the buffered data stream in place of the original P-frames at step 105. Alternately, at step 106, each P-frame may be re-encoded as an I-frame and any or all P-frames may be replaced with such I-frames at step 105.

Figure 3:
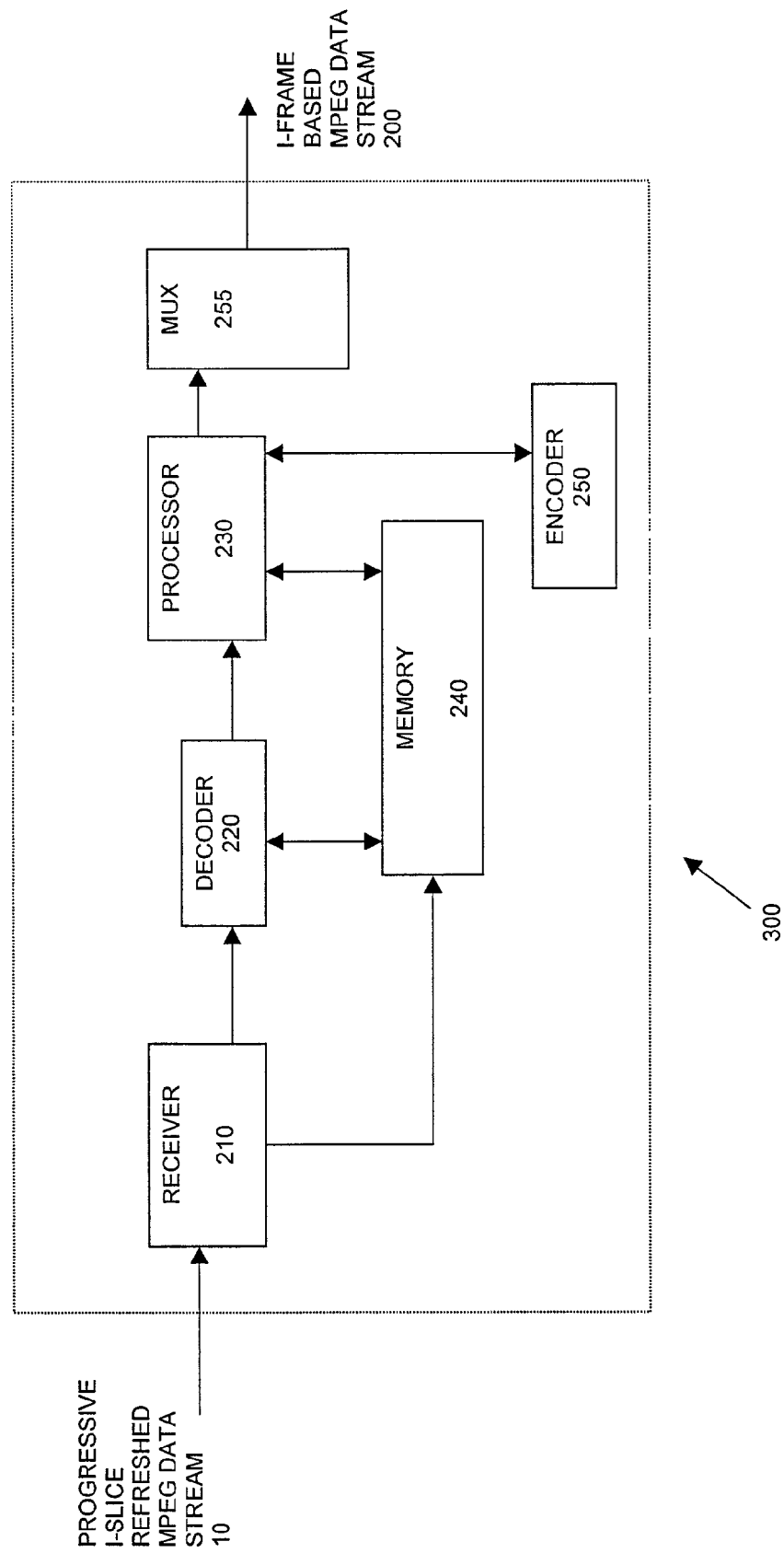
FIG. 3 shows a block diagram of an example implementation in accordance with the present invention.

In an exemplary embodiment of the invention shown in FIG. 3, progressive I-slice refreshed MPEG data streams are transcoded to enable trick play mode features on a television appliance (e.g., a transcoder device). A progressive I-slice refreshed MPEG data stream 10 having I-slices distributed over multiple P-frames is received by a television appliance 300 (e.g., by receiver 210) The P-frames are decoded at decoder 220 to recover the I-slices which make up a complete I-frame. The recovered I-slices are assembled (e.g., by processor 230) into a complete I-frame. The complete I-frame is encoded at encoder 250. A selected P-frame in the MPEG data stream is replaced with the encoded I-frame (e.g., via multiplexer 255) to provide an encoded I-frame based data stream 200. The I-frame based data stream 200 is stored for trick play mode use.

Memory 240 may be provided on the television appliance 300 to buffer the recovered I-slices as the P-frames are decoded until the I-slices required to assemble a complete I-frame are recovered from the decoded P-frames. In addition, the memory 240 may be provided to buffer the incoming data stream 10 to enable the processor to insert the complete I-frame into the data stream in place of the selected P-frame. It will be appreciated by those skilled in the art that the memory device 240 may be implemented as two separate memory devices, a buffer for storing the recovered I-slices and a buffer for storing the incoming data stream 10.

The I-frame based data stream 200 may be stored for trick play mode use on the storage device 240 (or other storage device) located on the television appliance 300 or may be transferred to a storage device external to the television appliance 300. For example, the I-frame based data stream 200 may be stored on a personal versatile recorder (PVR), a digital video recorder, a set-top terminal, a digital television, a personal computer, or similar device.

Where the decoder 220 decodes N number of P-frames to recover the I-slices which make up the complete I-frame, the encoded I-frame may be inserted into the MPEG data stream 10 in place of Nth P-frame. For example, as shown in FIG. 1, if the I-slices 20, 25, 30 and 35 for a complete I-frame are distributed over four P-frames (P1, P4, P7 and P10), the complete I-frame may be inserted in the data stream in place of the fourth P-frame, P10. A complete I-frame may replace the selected P-frame at least once per refresh cycle.

In a further embodiment of the invention, one or more additional P-frames may be decoded to recover additional I-slices. These additional I-slices allow assembly of additional complete I-frames, which can then be inserted into the MPEG data stream 10 at a programmable rate. Continuing the example of FIG. 1 using four I-slices 20, 25, 301, and 35 to make up a complete I-frame, since each additional P-frame will contain an additional I-slice, this additional I-slice can be combined with the I-slices from the three previous P-frames to provide an additional complete I-frame. In FIG. 1, for example, after frame P10 is decoded, the next P-frame (not shown) can be decoded to recover the I-slice contained therein. This I-slice can then be combined with the three previous I-slices 25, 30 and 35 to provide an additional complete I-frame. This assumes that the position of each I-slice in the series of four I-slices in FIG. 1 repeats with each successive series of four I-slices so that the image portions are refreshed in the same order (i.e. the portion of the image refreshed by the fifth I-slice is the same as that refreshed by the first I-slice).

Further, additional I-frames can be inserted into the I-frame based data stream 200 at a programmable interval. For example, any of the decoded P-frames can be re-encoded as an I-frame and reinserted into the I-frame based data stream 10. The insertion of additional I-frames into the data stream provides more access points and allow finer registration for trick play modes.

The trick play mode features may comprise at least one of pause, scan forward, scan backward, jump, and still frame display. "Jump" can be, for example, skip backward ten seconds, skip forward thirty seconds, instant replay, or jump to chapter or bookmark (e.g., in a DVD, etc.).

In an alternate embodiment, the decoder 220 may determine whether the incoming data stream is an I-frame based MPEG data stream or a progressive I-slice refreshed MPEG data stream. In the event that the data stream is an I-frame based MPEG data stream, the data stream may be stored (e.g., in memory 240 or an external storage device) for trick play mode use without further processing. Additional I-frames may be inserted into the I-frame based MPEG data stream, using the process described above, prior to storing the data stream for trick play mode use. In the event that the MPEG data stream is a progressive I-slice refreshed MPEG data stream, the data stream will be processed for trick play mode use as discussed above.

The television appliance 300 may be a stand alone transcoder device or may be implemented as part of a personal versatile recorder (PVR), a digital video recording device, a set-top terminal, a digital television, a personal computer, or the like.

The extracted P-frames may be re-encoded using motion estimation techniques in order to remove the I-slices. These re-encoded P-frames may then be inserted into the data stream in place of the original P-frames. Such a procedure requires additional processing power, but reduces the overall bit rate of the resulting I-frame based MPEG data stream 200.

Figure 4:
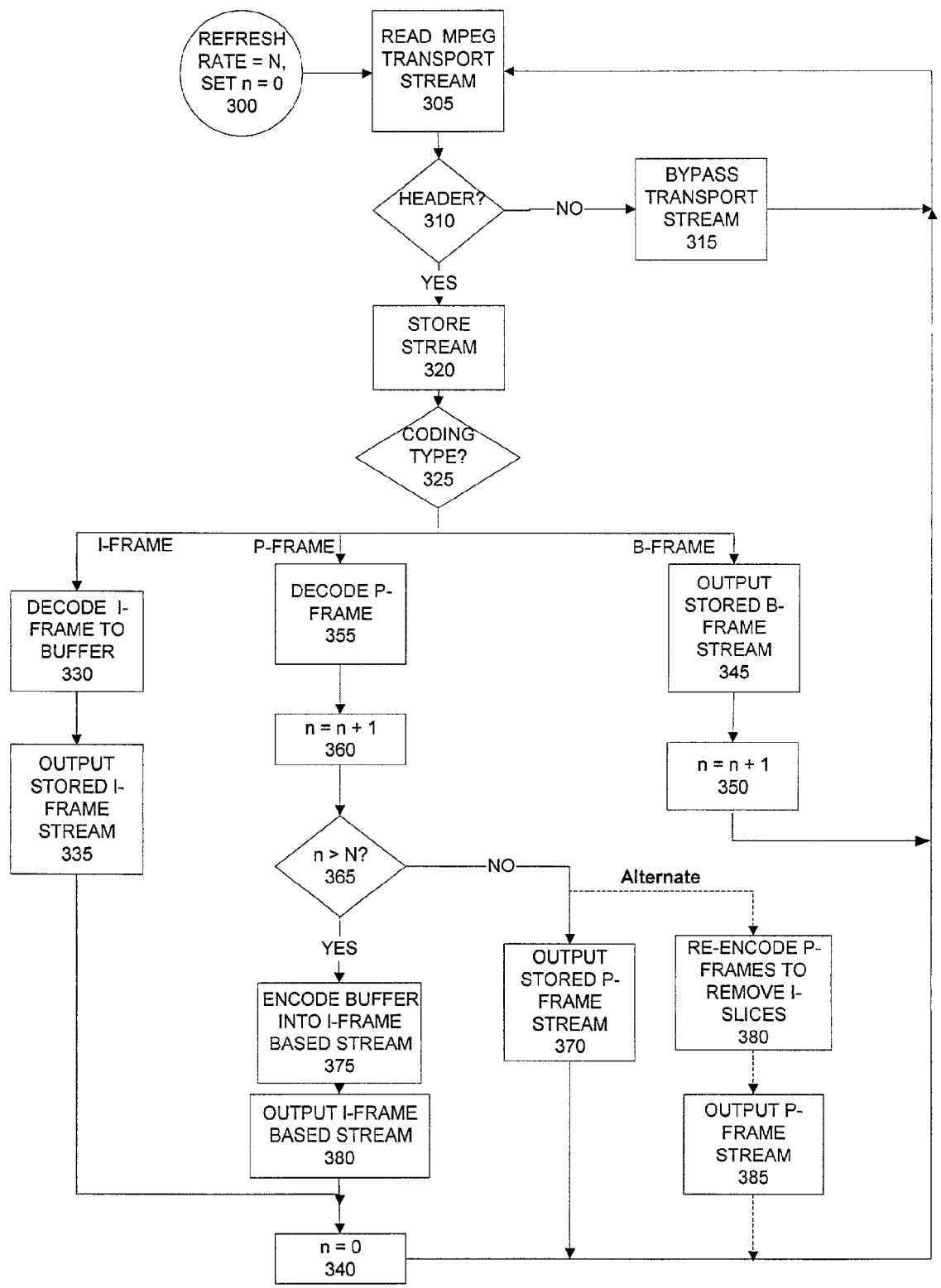
FIG. 4 shows a flow chart illustrating a further procedure for transcoding a progressive I-slice refreshed MPEG data stream to an I-frame based MPEG data stream in accordance with the present invention.

FIG. 4 shows a flowchart illustrating a specific embodiment of the invention. The refresh rate N of the system is set and a counter n is set to zero (300). The incoming MPEG transport stream is read (305). The presence of a picture header is determined (310). In the event no picture header is detected, the transport stream is bypassed (315) and the process is repeated. If a picture header is detected, the transport stream is stored (320). The picture coding type is determined (325) (i.e. whether I, P or B frames are present).

If the transport stream is an I-frame based stream, the I-frame is decoded and stored in a buffer (330). The I-frame based stream can then be output (335) for trick play mode use without further processing as discussed above. The counter will be set to n=0 (340) and the process can be repeated.

If the picture coding type detects the presence of B-frames, the B-frame based stream is stored (345) and the counter is incremented by n=n+1 (350). The process is then repeated.

If the picture coding type detects the presence of P-frames, the P-frames are decoded (355) to recover I-slices as discussed above. The counter is incremented by n=n+1 (360). The refresh rate N is compared to n (365). If n is less than the refresh rate, the P-picture stream is stored 370 and the process is repeated until n is greater than the refresh rate N (until a complete refresh cycle has passed and all I-slices for a complete I-frame have been recovered. Once n is determined to be greater than n, the complete I-frame is encoded and placed into the stream in place of a P-frame (375). The I-frame based stream is output for trick play mode use. The counter can then be set to n=0 (340) and the process repeated.

As discussed above, the P-frames can also be re-encoded using motion estimation techniques to remove the I-slices (380) in order to reduce the bit rate. The P-frame based stream can then be output (385) and the process repeated.

A simulation of the transcoding algorithm of the present invention showed a modest increase in bit rate for the I-frame based MPEG stream 200 as compared to the incoming progressive I-slice refreshed MPEG data stream, but no visible loss in video quality after transcoding. The invention may be implemented using an MPEG decoder having a flexible processing core, such that the transcoding algorithm can be implemented in microcode. This enables simple and fast switching between progressive I-slice refreshed MPEG data streams and I-frame based MPEG data streams. It is believed that this algorithm can best be performed in a processor based MPEG-2 decoder chip, such as the Broadcom RISC based decoder chips or the TeraLogic MPEG-2 decoder chips. Of course, other implementations will be apparent to those skilled in the art without departing from the teachings of the present invention.

It should now be appreciated that the present invention provides a method and apparatus for transcoding progressive I-slice refreshed MPEG data streams or the like to I-frame based MPEG data streams to enable trick play mode playback. The invention can be implemented for use with a personal versatile recorder and a cable television set top box. The invention lowers the cost and improves the quality of providing PVR service in any video distribution system that uses the progressive I-slice refreshed MPEG encoding mode, as well as other types of progressively refreshed data streams.

Although the invention has been described in connection with various specific embodiments, it should be appreciated that numerous adaptations and modifications may be made thereto without departing from the scope of the invention as set forth in the claims.

What is claimed is:

1. A method for transcoding progressive I-slice refreshed MPEG data streams to enable trick play mode features on a television appliance, comprising the steps of: receiving at the appliance a progressive I-slice refreshed MPEG data stream having I-slices distributed over multiple P-frames; decoding the P-frames to recover the I-slices which make up a complete I-frame; assembling the recovered I-slices into a complete I-frame; encoding the complete I-frame; replacing a selected P-frame in the MPEG data stream with the encoded I-frame to provide an I-frame based MPEG data stream; and storing the I-frame based MPEG data stream for trick play mode use.

2. A method in accordance with claim 1, comprising: storing each recovered I-slice in memory as each P-frame is decoded until all I-slices required to assemble a complete I-frame are recovered from the decoded P-frames.

3. A method in accordance with claim 1, comprising: storing the received progressive I-slice refreshed MPEG data stream.

4. A method in accordance with claim 1, wherein the I-frame based data stream is stored on one of a personal versatile recorder (PVR), a digital video recorder, a set-top terminal, a digital television, or a personal computer.

5. A method in accordance with claim 1, wherein: a number N of P-frames are decoded to recover the I-slices which make up the complete I-frame; and the encoded I-frame is inserted into the MPEG data stream in place of Nth P-frame.

6. A method in accordance with claim 5, wherein: one or more additional P frames are decoded to recover additional I-slices; the additional I-slices allow assembly of additional complete I-frames; and said additional complete I-frames are insertable after encoding into the MPEG data stream at a programmable rate.

7. A method in accordance with claim 1, comprising: inserting additional I-frames into the I-frame based data stream at a programmable interval.

8. A method in accordance with claim 1, wherein the encoded I-frame replaces the selected Pframe at least once per refresh cycle.

9. A method in accordance with claim 1, wherein the trick play mode features comprise at least one of pause, scan forward, scan backward, jump, and still frame display.

10. A method in accordance with claim 1, comprising: determining whether the data stream is an I-frame based MPEG data stream or a progressive I-slice refreshed MPEG data stream, such that, in the event that the data stream is an I-frame based MPEG data stream, the data stream is stored for trick play mode use without further processing.

11. A method in accordance with claim 1, comprising: determining whether the data stream is an I-frame based MPEG data stream or a progressive I-slice refreshed MPEG data stream; and in the event that the data stream is an I-frame based MPEG data stream, inserting additional I-frames into the data stream prior to storing the data stream for trick play mode use.

12. A method in accordance with claim 1, wherein the television appliance is one of a personal versatile recorder (PVR), a digital video recording device, a set-top terminal, a digital television, or a personal computer.

13. A method in accordance with claim 1, wherein: the P-frames are re-encoded using motion estimation techniques in order to remove the I-slices.

14. A television appliance capable of transcoding progressive I-slice refreshed MPEG data streams to enable trick play mode features, comprising: a receiver for receiving a progressive I-slice refreshed MPEG data stream having I-slices distributed over multiple P-frames; a decoder for decoding the P-frames to recover the I-slices which make up a complete I-frame; a processor associated with the decoder for assembling the recovered I-slices into a complete I-frame; an encoder for encoding the complete I-frame; and a multiplexer for replacing a selected P-frame in the MPEG data stream with the encoded I-frame to provide an encoded I-frame based MPEG stream; wherein: said I-frame based data MPEG stream is stored on a storage device for trick play mode use.

15. An appliance in accordance with claim 14, comprising: memory for storing each recovered I-slice as each P-frame is decoded until all I-slices required to assemble a complete I-frame are recovered from the decoded P-frames.

16. An appliance in accordance with claim 14, comprising: memory for storing the received progressive I-slice refreshed MPEG data stream.

17. An appliance in accordance with claim 14, wherein said storage device is external to said television appliance.

18. An appliance in accordance with claim 14, wherein: a number N of P-frames are decoded to recover the complete I-frame; and the encoded I-frame replaces the Nth P-frame.

19. An appliance in accordance with claim 18, wherein: one or more additional P frames are decoded to recover additional I-slices; the additional I-slices allow assembly of additional complete I-frames; and said additional complete I-frames are insertable after encoding into the MPEG data stream at a programmable rate.

20. An appliance in accordance with claim 14, wherein: additional I-frames are inserted into the I-frame based data stream at a programmable interval.

21. An appliance in accordance with claim 14, wherein the encoded I-frame replaces the selected P-frame at least once per refresh cycle.

22. An appliance in accordance with claim 14, wherein the trick play mode features comprise at least one of pause, scan forward, scan backward, jump, and still frame display.

23. An appliance in accordance with claim 14, wherein the receiver determines whether the data stream is an I-frame based MPEG data stream or a progressive I-slice refreshed MPEG data stream, such that, in the event that the data stream is an I-frame based MPEG data stream, the data stream is stored in the storage device for trick play mode use without further processing.

24. An appliance in accordance with claim 14, wherein: the receiver determines whether the data stream is an I-frame based MPEG data stream or a progressive I-slice refreshed MPEG data stream; and in the event that the data stream is an I-frame based MPEG data stream, the processor inserts additional I-frames into the data stream prior to storage of the data stream for trick play mode use.

25. An appliance in accordance with claim 14, wherein the appliance is one of a personal versatile recorder (PVR), a digital video recording device, a set-top terminal, a digital television, or a personal computer.

26. An appliance in accordance with claim 14, wherein: the encoder re-encodes the P-frames using motion estimation techniques in order to remove the I-slices.

* * * * *